May 7, 1940.  R. BUCK  2,199,587
HOG TROUGH
Filed Dec. 29, 1938    2 Sheets-Sheet 1
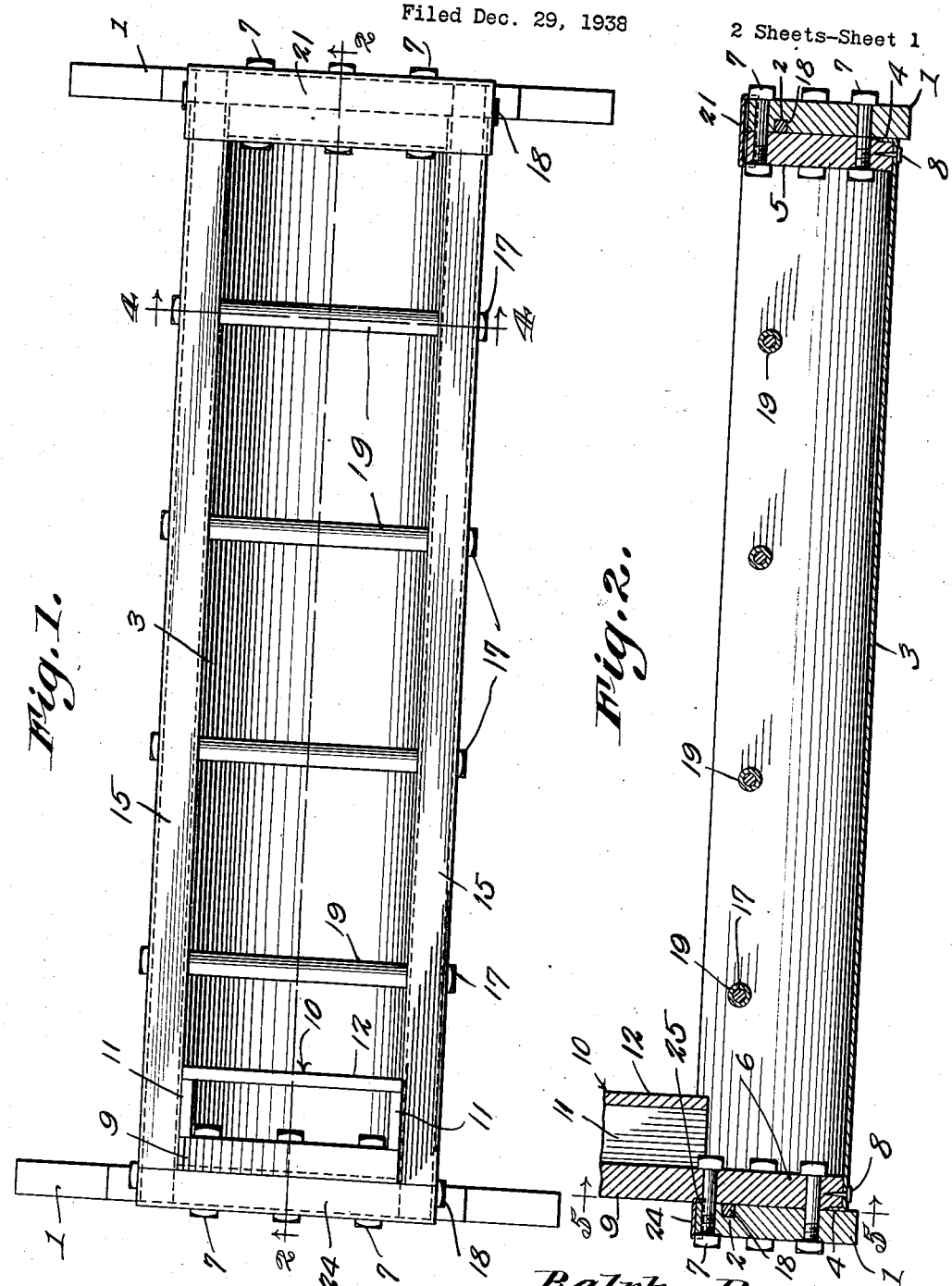
Ralph Buck
INVENTOR.
BY CASnowles
ATTORNEYS.

May 7, 1940.                R. BUCK                2,199,587
                           HOG TROUGH
                       Filed Dec. 29, 1938            2 Sheets-Sheet 2
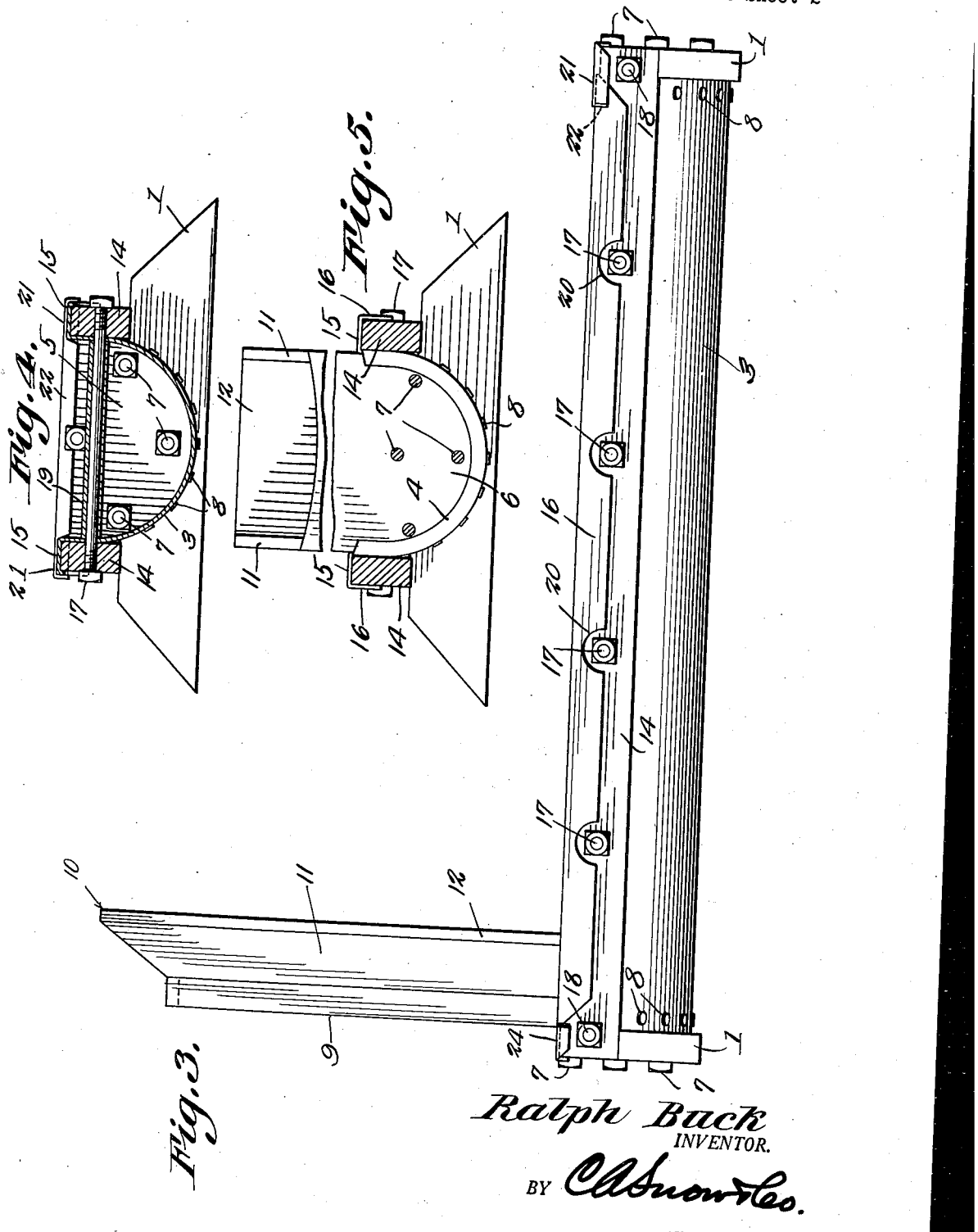
Ralph Buck
INVENTOR.
BY C. A. Snow & Co.
ATTORNEYS.

Patented May 7, 1940

2,199,587

UNITED STATES PATENT OFFICE 2,199,587

HOG TROUGH

Ralph Buck, De Graff, Ohio

Application December 29, 1938, Serial No. 248,334

1 Claim. (Cl. 119—52)

This invention aims to provide a novel hog feeder, whereby the trough can be provided at one end with a vertical chute, into which swill may be cast conveniently, the swill finding its way readily down into the trough, as the swill in the trough is eaten.

Another object of the invention is to provide a device of the class described in which the trough is held and supported by a simple but durable means.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in top plan, a hog feeder constructed in accordance with the invention;

Fig. 2 is a longitudinal section on the line 2—2 of Fig. 1, parts being broken away;

Fig. 3 is a side elevation;

Fig. 4 is a cross section on the line 4—4 of Fig. 1;

Fig. 5 is a transverse section on the line 5—5 of Fig. 2.

The hog feeder forming the subject matter of this application may be made out of any desired material, or combination of materials. It includes horizontally elongated supports 1, provided on their inner surfaces, and near to their upper edges, with cross grooves 2. A trough 3, preferably made of metal and of approximately semi-circular cross section, extends between the supports 1. At its ends, the trough 3 is supplied with rectangularly arranged flanges 4, disposed against the inner surfaces of the supports 1.

A short end first wall 5 is located in one end of the trough 3 and conforms to the cross section of the trough. A higher second end wall 6 is disposed in the opposite end of the trough 3, and is shaped at its lower end to correspond with the cross section of the trough. Securing devices 7, such as bolts, connect the end wall 5 with one of the supports 1, corresponding bolts connecting the other support with the end wall 6. The end flanges 4 of the trough 3 are bound tightly between the parts 6—1 and 5—1, by the operation of the bolts 7, and a tight joint results. Securing devices 8, such as nails or screws, are used to attach the end portions of the trough 3 to the walls 5 and 6.

The wall 6 has an upstanding extension 9, forming the front wall of a vertical chute 10, leading downwardly into one end of the trough 3. The side walls 11 of the chute 10 are secured to the front wall 9, and the back wall 12 of the chute is secured to the side walls 11. The wall 9 of the chute 10 preferably is somewhat lower than the wall 12, so that swill can be thrown readily into the chute, from one end of the feeder. If the trough 3 is reasonably full of feed, the feed in the chute 10 will move downwardly under its own weight, as the feed in the trough 3 is depleted. In any event, the chute 10 constitutes a convenient means for introducing feed into the trough 3, and it is unnecessary for the operator, wishing to place feed in the trough 3, to worm his way in amongst the swine, or to stoop down and pour the feed directly into the trough 3.

Along the outside of the trough 3, at the upper edges thereof, extend beams 14, resting at their ends on the supports 1. The trough 3 is supplied at its upper edge with wings 15, which extend outwardly over the beams 14, and downwardly on the outer surfaces of the beams, as shown at 16.

Opposed portions of the trough 3 are joined by connecting devices 17, such as bolts, mounted in the beams 14. About the bolts 17 are placed tubular spacers 19, which hold the trough 3 to its original semi-circular contour and the trough is prevented from caving inwardly. The depending parts 16 of the wings 15 of the trough, are cut away as shown at 20, so that the heads and nuts of the bolts 18 can have a full-surfaced bearing against the beams 14. Connecting devices such as bolts 18 are mounted in the grooves 2 which are formed in the inner surfaces of the supports 1 and connect the beams 14.

Over the end wall 5 and the corresponding support 1 is secured a cover plate 21, which, along its longitudinal edges, is supplied with depending flanges 22, overlapping the inner surface of the end wall 5 and the outer surface of the corresponding support 1. A similarly constructed cover plate 24 is placed over the upper edge of the support 1 that is adjacent to the end wall 6. The inner depending flange 25 of the cover plate 24 is bound between the end wall 6 and the corresponding support 1, as shown in Fig. 2 of the drawings.

It is to be noted that the beams 14 are mounted on the extreme upper edges of the supports 1, and are not let into recesses in the upper edges of the supports. This is done in order that the trough 3 may be deep, and hold as much feed as possible. Since the trough 3 is deep, the end wall 5 has to be of corresponding height; and for a like reason, and because it is part of the chute 10, the wall 6 has to be of still greater height than the wall 5. Owing to the increased height of the walls 5 and 6, they tend to warp and split, due to moisture, and it is no small matter to keep moisture, either due to the weather, or derived from the wet feed in the trough 3, out of the walls. It is necessary to bind the walls 5 and 6 to the supports 1 tightly, and to cap the contacting parts 5—1 and the part 1 that is in contact with the wall 6, in such a way that moisture will be excluded. Here note that the supports 1 are provided with the grooves 2, which receive the connecting devices 18, and the connecting devices 18 do not prevent the parts 1—5 and 1—6 from being drawn tightly together.

The covers 21 and 24 serve to keep moisture from entering between the parts 1—5 and 1—6. The uppermost bolt 7 at the right hand end of Fig. 2 is located high up and very close to the upper edges of the parts 1 and 5, and the said parts need to be bound together tightly there, because, as hereinbefore pointed out, they are of increased height. Referring to the left end of Fig. 2, the inner flange 25 of the cover 24 is gripped tightly because it is bound between the wall 6 and the adjacent support 1.

The device forming the subject matter of this application is simply and easily constructed out of stock materials and calls for no specially constructed parts. The device is strong, and well adapted to withstand hard usage.

Having thus described the invention, what is claimed is:

A hog feeder comprising supports, beams mounted on the extreme upper edges of the supports, a trough between the beams and extended to the upper edges thereof, first and second end walls assembled with the trough, each end wall and one support constituting cooperating, contacting elements, a first cover extended over the upper edges of the first end wall and the corresponding support and having depending flanges engaging the remote, outer surfaces of the first end wall and the corresponding support, a second cover extended over the upper edge of the second support, and having depending flanges, one of which extends between the second end wall and the corresponding support, to permit the second end wall to be extended upwardly and form part of a chute discharging into the trough, the other of the flanges of the second cover overlapping the outer surface of the corresponding support, tightening devices connecting the supports and the end walls and binding them closely together, and connecting devices joining the beams, one of each of said contacting elements having a recess receiving the corresponding connecting device, to permit said contacting elements to be drawn closely together by the tightening devices.

RALPH BUCK.